US006425525B1

(12) United States Patent
Swaminathan et al.

(10) Patent No.: US 6,425,525 B1
(45) Date of Patent: Jul. 30, 2002

(54) SYSTEM AND METHOD FOR INPUTTING, RETRIEVING, ORGANIZING AND ANALYZING DATA

(75) Inventors: Kishore Sundaram Swaminathan, Downers Grove; Mark Alexander Jones; Beth M. Lange, both of Evanston; James L. Meyers, Chicago, all of IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/272,828

(22) Filed: Mar. 19, 1999

(51) Int. Cl.⁷ ............................................. G06F 17/60
(52) U.S. Cl. ...................................... 235/385; 235/375
(58) Field of Search ................................ 235/375, 380, 235/382, 382.5, 385; 705/4, 5, 15, 26, 29, 42

(56) References Cited

U.S. PATENT DOCUMENTS

| | | |
|---|---|---|
| 4,643,501 A | 2/1987 | Coffin |
| 4,974,168 A | 11/1990 | Marx |
| 5,258,606 A | 11/1993 | Chadima, Jr. et al. |
| 5,321,520 A | 6/1994 | Inga et al. |
| 5,329,444 A | 7/1994 | Takahashi et al. |
| 5,361,200 A | 11/1994 | Weybright et al. |
| 5,378,883 A | 1/1995 | Batterman et al. |
| 5,384,643 A | 1/1995 | Inga et al. |
| 5,455,906 A | 10/1995 | Usuda |
| 5,537,141 A * | 7/1996 | Harper et al. .................. 348/12 |
| 5,537,462 A * | 7/1996 | Utter et al. .................. 379/102 |
| 5,550,966 A | 8/1996 | Drake et al. |
| 5,551,025 A | 8/1996 | O'Reilly et al. |
| 5,627,349 A | 5/1997 | Shetye et al. |
| 5,740,549 A | 4/1998 | Reilly et al. |
| 5,794,216 A | 8/1998 | Brown |
| 5,835,061 A | 11/1998 | Stewart |
| 5,848,396 A | 12/1998 | Gerace |
| 5,848,420 A | 12/1998 | Xu |
| 5,861,918 A | 1/1999 | Anderson et al. |
| 5,866,888 A * | 2/1999 | Bravman et al. ............ 235/375 |
| 5,880,769 A | 3/1999 | Nemirofsky et al. |
| 5,943,653 A | 8/1999 | Ross et al. |
| 5,949,411 A * | 9/1999 | Doerr et al. ................. 345/327 |
| 5,973,731 A * | 10/1999 | Schwab ................... 235/380 X |
| 6,064,976 A * | 5/2000 | Tolopka ......................... 705/9 |
| 6,072,396 A | 6/2000 | Gaukel |

FOREIGN PATENT DOCUMENTS

| | | |
|---|---|---|
| GB | 2 327 565 | 1/1999 |
| WO | 93/07570 | 4/1993 |

OTHER PUBLICATIONS

Komo et al., "Multimedia medical data archive and retrieval server on the internet", SPIE vol. 3035, pp. 72–75.

U.S. patent application Ser. No. 09/263,927, filed Mar. 5, 1999, "Mobile Communication System and Method for a Shopper Agent", Gershman et al.

U.S. patent application Ser. No. 09/263,969, filed Mar. 5, 1999, "Mobile Communication and Computing System and Method", Gershman et al.

U.S. patent application Ser. No. 09/263,926, filed Mar. 5, 1999, "A System, Method and Article of Manufacture for Advanced Mobile Health Care Processing", Gershman et al.

U.S. patent application Ser. No. 09/263,920, filed Mar. 5, 1999, "Dynamic Configuration System and Method for a Mobile Communication Network", Gershman et al.

(List continued on next page.)

Primary Examiner—Karl D. Frech
(74) Attorney, Agent, or Firm—Morrison & Foerster LLP

(57) ABSTRACT

A system is provided including at least one remote input device for recording remote data and a host computer for receiving and storing the remote data from the remote input device. Also included is at least one local input device coupled to the host computer for retrieving the remote data within the host computer. Associated therewith is at least one local output device that is coupled to the host computer for retrieving the data.

17 Claims, 10 Drawing Sheets

OTHER PUBLICATIONS

U.S. patent application Ser. No. 09/263,252, filed Mar. 5, 1999, "System, Method and Articled of Manufacture for Mobile Communication Utilizing an Interface Support Framework", Gershman et al.

U.S. patent application Ser. No. 09/263,251, filed Mar. 5, 1999, "A System for Utilizing a Transaction Interface in a Mobile Communication Network", Gershman et al.

Douglass R. Cutting, David R. Karger, Jan O. Pedersen, John W. Tukey; Scatter/Gather: A Cluster–based Approach to Browsing Large Document Collections; 1992.

Peter Pirolli, Patricia Schank, Marti Hearst, Christine Diehl; Scatter/Gather Browsing Communicates the Topic Structure of a Very Large Text Collection; Human Factors on Computing Systems CHI '96, 213–220; New York: Association for Computing Machinery.

Frederich N. Tou, Michael D. Williams, Richard Fikes, Austin Henderson, Thomas Malone; RABBIT: An Intelligent Database Assistant; Aug. 1982; The National Conference on Artificial Intelligence.

Abigail Sellen, Richard Harper; Paper as an Analytic Resource for the Design of New Technologies; CHI, Mar. 1997.

Thomas P. Moran, Leysia Palen, Steve Harrison, Patrick Chiu, Don Kimber, Scott Minneman, William van Melle, Polle Zellweger; "I'll Get That Off the Audio": A Case Study of Salvaging Mulitmedia Meeting Records; CHI, Mar. 1997.

James A. Landay, Brad Myers; Interactive Sketching for the Early Stages of User Interface Design; (no date).

Toshifumi Arai, Dietmar Aust, Scott E. Hudson; PaperLink: A Technique for Hyperlinking from Real Paper to Electronic Content; CHI, Mar. 1997.

Willian Newman, Pierre Wellner; A Desk Supporting Computer–based Interaction with Paper Documents; CHI, May 1992.

Elin Ronby Pedersen, Kim McCall, Thomas P. Moran, Frank G. Halasz; Tivoli: An Electronic Whiteboard for Informal Workgroup Meetings; INTERCHI, Apr. 1993.

Wendy E. Mackay, Daniele S. Pagani; Video Mosaic: Laying Out Time in a Physical Space; 1994.

John Hughes, Val King, Tom Rodden, Hans Andersen; The Role of Ethnography in Interactive Systems Design; Apr. 1995.

John M. Carroll, Sherman R. Alpert, John Karat, Mary Van Deusen, Mary Beth Rosson; Raison d'Etre: Capturing Design History and Rationale in Multimedia Narratives; & John L.Bennett, John Karat; Facilitating Effective HCI Design Meetings; CHI, Apr. 1994.

Scott Lewis, Michael Mateas, Susan Palmiter, Gene Lynch; Interactions, Nov., Dec., 1996.

Thomas P. Moran, Patrick Chiu, Steve Harrison, Gordon Kurtenbach, Scott Minneman, William van Melle; Evolutionary Engagement in an Ongoing Collaborative Work Process: A Case Study; Computer Supported Cooperative Work, 1996.

Victoria Bellotti; Integrating Theoreticians' and Practitioners' Perspectives With Design Rationale; INTERCHI, Apr. 1993.

Steve Sato, Kishore Swaminathan; Interaction Design for Large Displays; Interactions, Jan., Feb., 1997.

Debra Kong et al., "Would you like ads on mobile phone? Payment for digital data is major emergent issue", San Jose Mercury News, Jul. 7, 1999, Dialog file #634, #10188058.

Janet Kornblum, "Advertisers target ads to pagers, phones" USA Today, Jun. 23, 1999, Dialog file 703, #08669956.

Mark Vernon, "Tune in and shop", Independent, Nov. 11, 1996, Dialog file 711, #08816199.

* cited by examiner

| | | |
|---|---|---|
| ⅰⅼⅼⅰⅼⅰ | TITLE, | DESCRIPTION |
| ⅰⅼⅼⅰⅼⅰ | TITLE, | DESCRIPTION |
| ⅰⅼⅼⅰⅼⅰ | TITLE, | DESCRIPTION |
| ⅰⅼⅼⅰⅼⅰ | TITLE, | DESCRIPTION |
| ⅰⅼⅼⅰⅼⅰ | TITLE, | DESCRIPTION |
| ⅰⅼⅼⅰⅼⅰ | TITLE, | DESCRIPTION |
| ⅰⅼⅼⅰⅼⅰ | TITLE, | DESCRIPTION |
| ⅰⅼⅼⅰⅼⅰ | TITLE, | DESCRIPTION |

Themes
Contribution to
Knowledge
System

Findings, Issues, Requirements
Issue: People will share knowledge if they know who is using it.
Requirement: Feedback mechanisms are needed to enhance sharing.

Patterns
People spend large amounts of time sharing knowledge via email and phone.

Hypotheses
People have no time to contribute to knowledge repositories.

Evidence
Joe Smith: "I don't have any time to contribute."
Joe Smith: "I spend about 8 hrs/wk helping others."

FIGURE 9

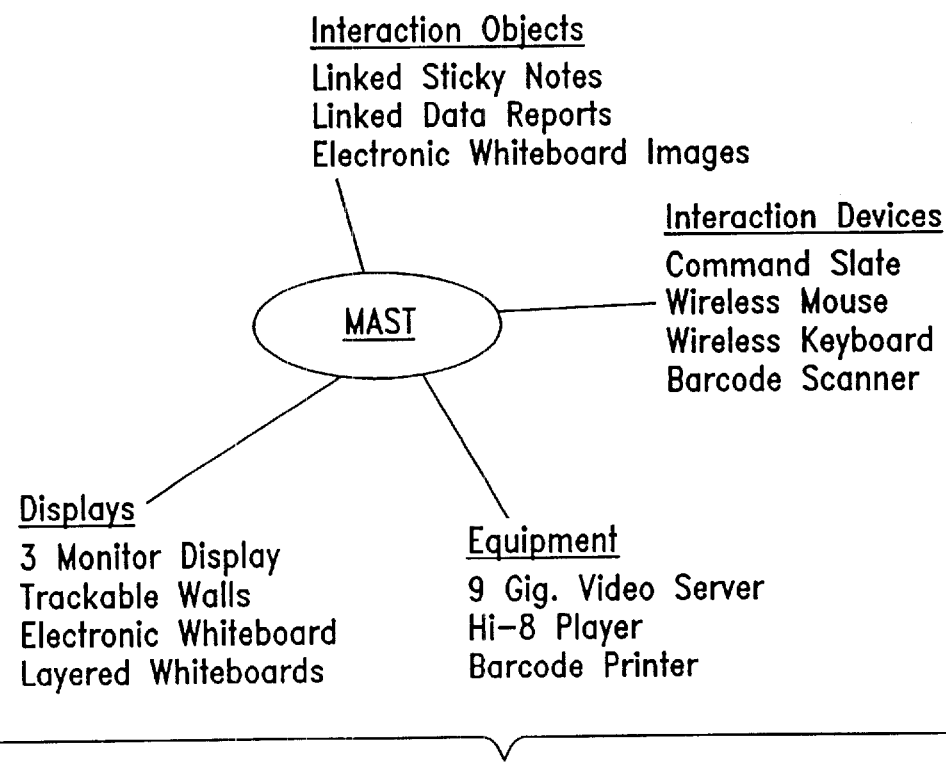

FIGURE 10

SYSTEM AND METHOD FOR INPUTTING, RETRIEVING, ORGANIZING AND ANALYZING DATA

FIELD OF INVENTION

The present invention relates to data collection systems and more particularly pertains to a system for inputting, retrieving, and analyzing data in an organized and thus effective manner.

BACKGROUND OF INVENTION

The collection and analysis of data is an essential component of making various decisions in the marketplace. The collection of data may take on many forms including, but not limited to recording video, images, audio, hard numerical data, or the like. While the information present in data is often invaluable in many respects, it can sometimes be difficult to extract that information on which a decision is to be based. For example, in cases where the amount of collected data rises to substantial levels, confusion may arise if the data is not maintained in order. In addition, a lack of organization may inhibit an extent to which a team can analyze the data effectively.

Moreover, even if a proper conclusion has been arrived at, there may be a subsequent need to review the basis on which the conclusion was founded for one reason or another. Here again, lack of organization often obscures the train of thought that rationalized the proper conclusion. As such, there is a substantial need for a system and method for inputting, retrieving, and analyzing data in an organized and thus effective manner.

Further research includes the following pieces of literature which are each incorporated herein by reference:
1. Arai, T., Aust, D., and Hudson, S. E. PaperLink: A Technique for Hyperlinking from Real Paper to Electronic Content, in *Proceedings of CHI '97* (Atlanta Ga., March 1997), ACM Press, 327–334.
2. Bellotti, V., Integrating Theoreticians' and Practioners' Perspectives with Design Rationale, in *Proceedings of InterCHI '93* (Amsterdam, April 1993), ACM Press, 101–106.
3. Carroll, J., Alpert, S., Karat, J., Van Dusen, M., and Rosson, M. Raison d'Etre: Capturing design history and rationale in multimedia narratives, in *Proceedings of CHI '94* (Boston Mass., April 1994), ACM Press, 192–197.
4. Conklin, J. and Begeman, M.L. gIBIS: A Hypertext Tool for Exploratory Policy Discussion, in *Proceedings of CSCW '88* (Portland Oreg., September 1988), ACM Press, 140–152.
5. Holtzblatt, K. and Jones, S., Conducting and Analyzing a Contextual Interview, in Namioka and Schuler (Eds.) *Participatory Design: Principles and Practice,*. Lawrence Erlbaum Associates, Hillsdale, N.J., 1993.
6. Hughes, J., King, V., Rodden, T., and Andersen, H. The Role of Ethnography in Interactive Systems Design. *Interactions*, 2, 2 (April 1995), 57–65.
7. Jordan, B., and Henderson, A. Interaction Analysis: Foundations and Practice. *The Journal of the Learning Sciences* 4, 1 (1995), 39–103.
8. Landay, J. A., and Myers, B. A. Interactive Sketching for the Early Stages of User Interface Design, in *Proceedings of CHI '95* (Denver Colo., May 1995), ACM Press, 43–50.
9. Lewis, S., Mateas, M., Palmiter, S., and Lynch, G. Ethnographic Data for Product Development: A Collaborative Process. *Interactions*, 3, 6 (November/December 1996), 53–69.
10. Mackay, W. E., and Pagani, D. S. Video Mosaic: Laying Out Time in a Physical Space, in *Proceedings of Multimedia '94* (San Francisco, Calif., October 1994), ACM Press, 165–172.
11. Moran, T. P. and Anderson, R. J., The Workaday World as a Paradigm for CSCW Design, in *Proceedings of CSCW '90* (Los Angeles Calif., October 1990), ACM Press, 381–393.
12. Moran, T. P., Chiu, P., Harrison, S., Kurtenbach, G., Minneman, S., and van Melle, W. Evolutionary Engagement in an Ongoing Collaborative Work Process: A Case Study, in *Proceedings of CSCW '96* (Cambridge Mass., November 1996), ACM Press, 150–159.
13. Moran, T. P., Palen, L., Harrison, S., Chiu, P., Kimber, D., Minneman, S., van Melle, W., and Zellweger, P. "I'll Get That Off the Audio": A Case Study of Salvaging Multimedia Meeting Records, in *Proceedings of CHI '97* (Atlanta Ga., March 1997), ACM Press, 202–209.
14. O'Hara, K., and Sellen, A. A Comparison of Reading Paper and On-Line Documents, in *Proceedings of CHI '97* (Atlanta Ga., March 1997), ACM Press, 335–342.
15. Pedersen, E., McCall, K., Moran, T., and Halasz, F. Tivoli: an Electronic Whiteboard for Informal Workgroup Meetings, in *Proceedings of InterCHI '93* (Amsterdam, May 1993), ACM Press, 391–398.
16. Sellen, A., and Harper, R. Paper as an Analytic Resource for the Design of New Technologies, in *Proceedings of CHI '97* (Atlanta Ga., March 1997), ACM Press, 319–326.
17. Suchman, L. Representations of Work. *Communications of the ACM* 38, 9 (entire issue).
18. Suchman, L. A., and Trigg, R. H. Understanding Practice: Video as a Medium for Reflection and Design, in Greenbaum and Kyng (Eds.) *Design at Work: Cooperative Design of Computer Systems.* Lawrence Erlbaum Associates, Hillsdale, N.J., 1993.
19. Swaminathan, K., and Sato, S. Interaction Design for Large Displays. *Interactions* 4, 1 (January–February 1997), 15–24.
20. Wall, P., and Mosher, A. Representations of Work: Bringing Designers and Users Together, in *Proceedings of PDC '94* (Chapel Hill N.C., October 1994), ACM Press, 87–98.
21. Wellner, P. Interacting with Paper on the DigitalDesk. *Communications of the ACM* 36, 7 (1993), 97–96.

SUMMARY OF INVENTION

The present invention overcomes the problems associated with data collection, retrieval, and analysis by including at least one remote input device for recording remote data and a host computer for receiving and storing the remote data from the remote input device. Also included is at least one local input device coupled to the host computer for retrieving the remote data within the host computer. Associated therewith is at least one local output device that is coupled to the host computer for retrieving the data.

BRIEF DESCRIPTION OF DRAWINGS

The invention will be better understood when consideration is given to the following detailed description thereof. Such description makes reference to the annexed drawings wherein:

FIG. 9 illustrates an example for each element of the Analysis Framework of FIG. 8;

FIG. 10 depicts the Multimedia Analysis Software Tool (MAST) which supports data capture and storage, data entry, and searching and display capabilities and further manages the interactions between the objects, devices, equipment, and displays of the present invention;

DISCLOSURE OF INVENTION

Hardware Overview

Figure 1:
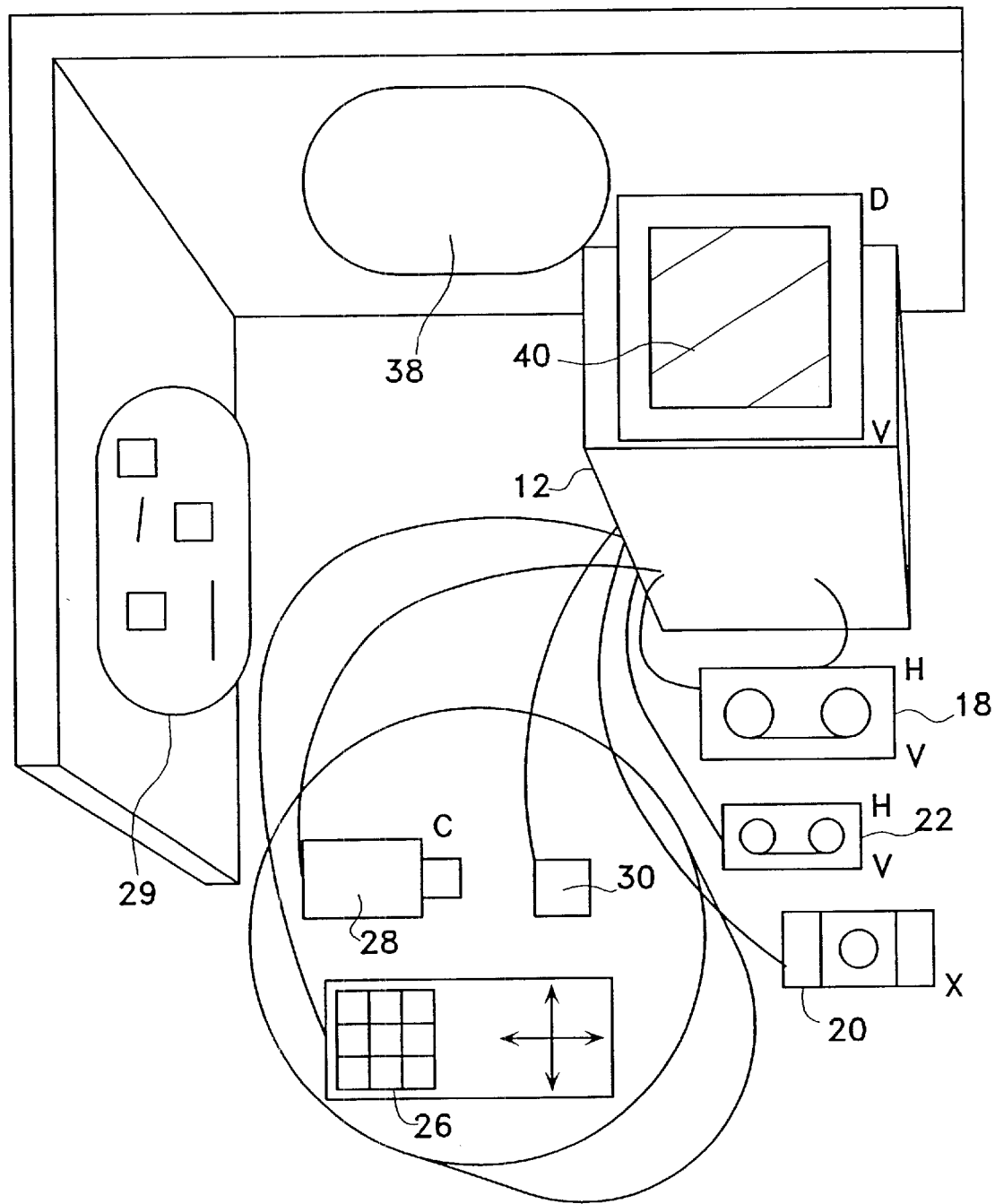
FIG. 1 is a perspective view of the present invention.
Figure 2:
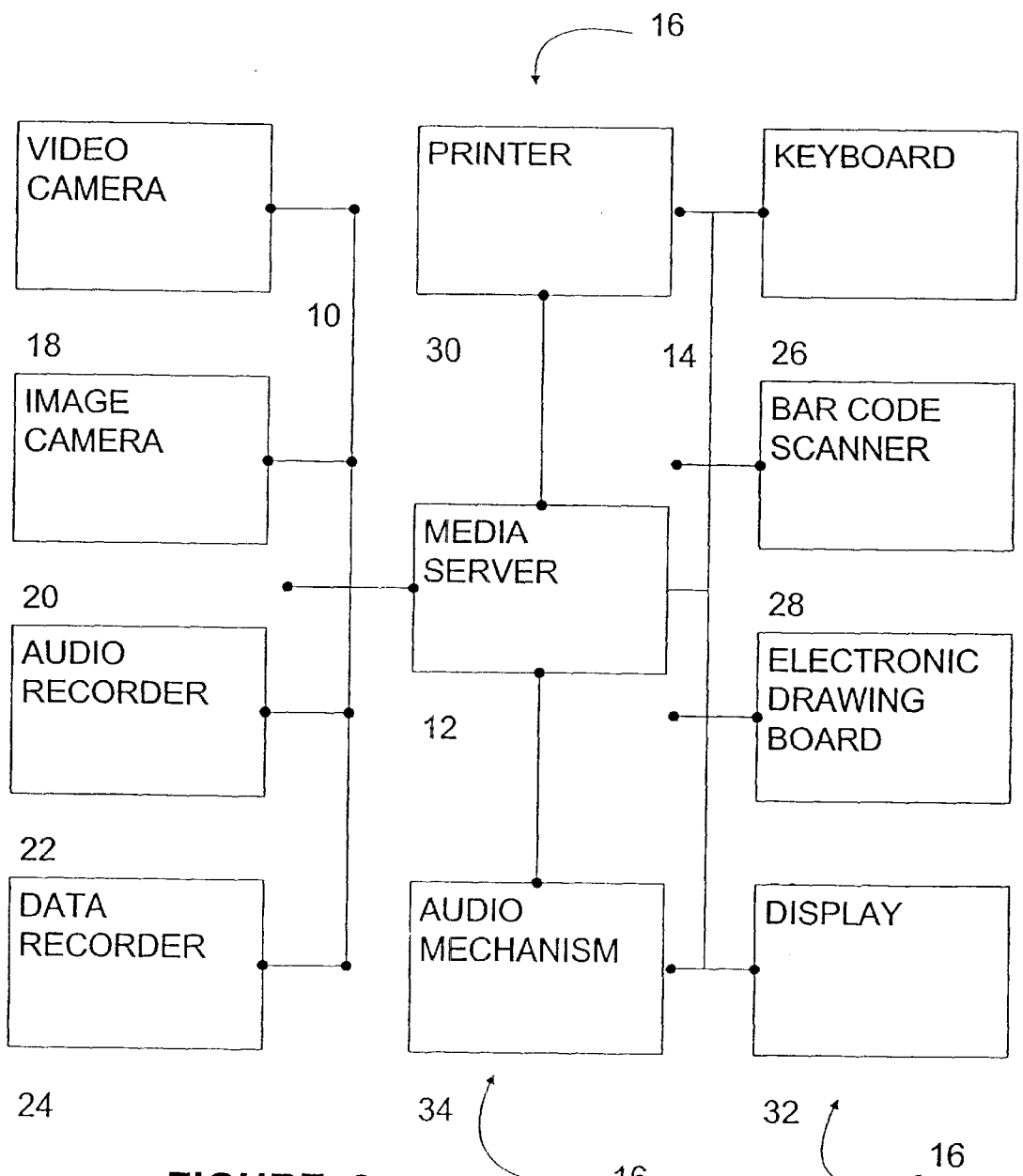
FIG. 2 is a schematic diagram of the present invention.

With reference to FIG. 1, the present invention includes at least one remote input device 10, a host computer 12, at least one local input device 14, and at least one local output device 16. Generally speaking, the remote input device 10 serves for recording remote data. In one embodiment, a plurality of remote input devices 10 are included for accomplishing this task. For example, the remote input devices 10 may include a video camera 18 for recording video signals, an image camera 20 for recording image signals, an audio recorder 22 for recording audio signals, and a data recorder 24 for recording hard data. It should be noted that any type of sensor, hard-line or wireless keyboard 26, measuring device, or input mechanism may be included for accumulating the remote data.

One task of the host computer 12 is to receive and store the remote data from the remote input devices 10. This may be accomplished by any type of parallel, serial, optical, radio transceiver, or any other device or connection capable of communicating the remote data between the remote input devices 10 and the host computer 12. In one embodiment, the host computer 12 may take the form of a media server, workstation, or any other type of computer capable of carrying out the necessary tasks. The manner in which the host computer 12 controls the present invention will be set forth hereinafter.

The local input device 14 is coupled to the host computer 12 for retrieving the remote data within the host computer 12. This may be accomplished within a lab or any other environment in which a single person or a group of people are capable of interacting while the remote data is being retrieved. In one embodiment, a plurality of local input devices 14 is included. For example, the local input devices 14 may include a keyboard 26, a bar code scanner 28, or any other input device capable of retrieving the remote data within the host computer 12. While one task of the local input devices 14 include retrieving the remote data within the host computer 12, yet another task associated therewith includes inputting local data into the host computer 12. To accomplish this additional task, the local input device 14 includes an electronic drawing board 29, the keyboard 26, or any other device for inputting local data.

With respect to the local output device 16, the same is coupled to the host computer 12 for exhibiting the data. In various embodiment, the local output device 16 may include a printer 30, a display 32, an audio mechanism 34, or any other type of output mechanism. Accordingly, output may be in the form of a hard copy or a visual image(s). In one embodiment, a pair of displays 32 may be provided including a projection screen 38 and a computer monitor 40.

In use, the host computer 12 operates to effectively input, retrieve, and organize the remote data so that additional local data may be generated and "linked" to the remote data in a lab environment amongst a number of people. This operation is delineated in the flowchart of FIG. 3 and may be carried out by the host computer 12 using specifically tailored software.

Software Overview

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are retrieved at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code.

Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in the program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writings a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language hag emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Description of Operation

Figure 3:
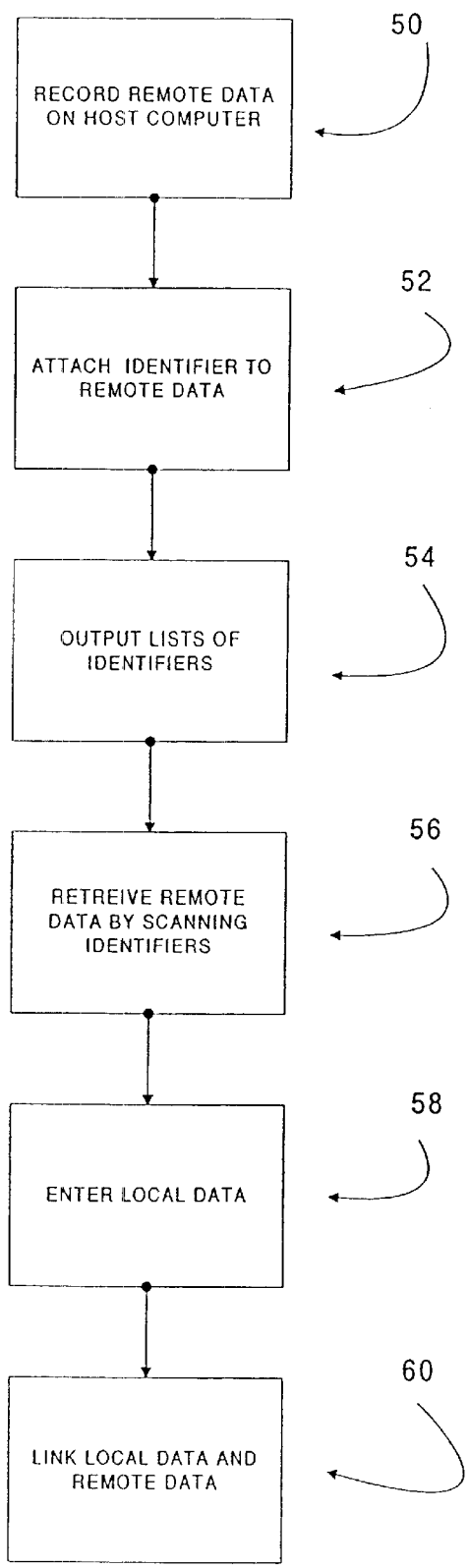
FIG. 3 is a flowchart delineating the method of use of the present invention.

In use, remote data is first recorded by way of the remote input devices 10 and stored in the host computer 12 in a digital format, as shown in box 50 of FIG. 3. Thereafter, the host computer 12 serves to identify the remote data by way of one of the local input devices 14 such as the keyboard 26. For example, once the remote data is stored in a digital format, an identifier may be entered which includes a written description 44 and an identification code 42. See box 52 of FIG. 3, In one embodiment, the written description 44 includes both a title and a short summary. It should be noted that the remote data may also be categorized by type, i.e. video, image, audio, hard data, etc., or by any other standard.

Figures 4, 5:
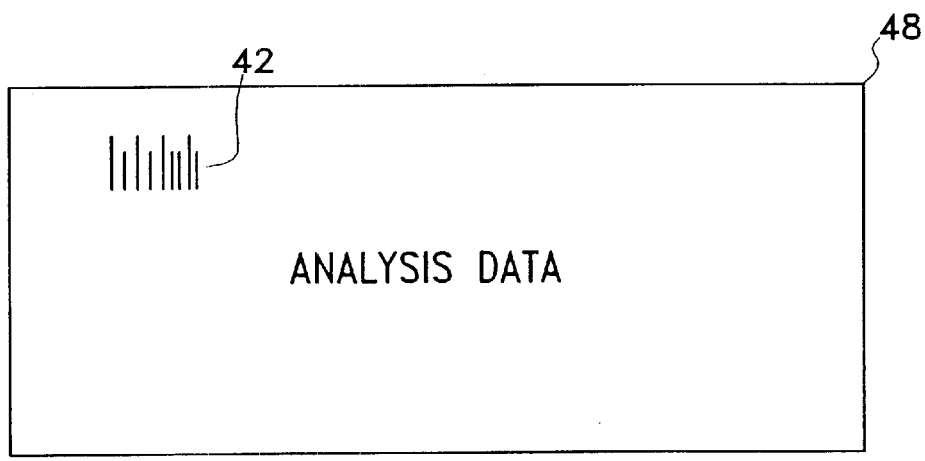
FIG. 4 is a front view of one of the lists of the present invention.
FIG. 5 is a front view of one of the cards of the present invention.

With all of the remote data loaded and identified, the same may be browsed by using the keyboard 26 and the display 32 of the host computer 12. In the alternative, the host computer 12 may be used to outputs lists 46 of the identifiers by way of one of the local output devices 16 such as the printer 30 or display 32, as shown in box 54 of FIG. 3. An example of such lists is shown in FIG. 4. The content of such lists 46 may be regulated by the users by selecting certain criteria regarding the type of remote data or items within the associated written descriptions 44. Given these output lists 46, the users may peruse the remote data. For reasons that will become apparent hereinafter, the identification codes 42 of the identifiers are printed adjacent to the associated written description 44. In one embodiment, the identification code 42 takes the form of a bar code.

The bar code comprises alternating black and white spaces. The information is contained in the relative length of the runs of the black. Each code begins with a special marker of a black space followed by a white space followed by another black space, where the length of the white space is approximately equal to the length of each of the surrounding black spaces. Subsequent runs of black are compared with the average length of the runs in the start sequence and are interpreted as multiples of that length. An ending sequence similar to the start sequence is required for a valid code.

While browsing the printed lists 46 of remote data, the host computer 12 is further capable of outputting the remote data in real-time by way of the appropriate output device, i.e. display 32, upon one of the identifiers being selected by the user. See box 56 of FIG. 3. To select a desired identifier from the list, the user may simply utilize the bar code scanner 28 to provide the host computer 12 with the identifier. Upon receipt of the identifier, the host computer 12 allows immediate output of the corresponding remote data to be experienced by the users.

As the remote data is being analyzed in real-time via the foregoing method, the users may wish to record local data, i.e. discussion, comments, etc., regarding certain groups of the remote data. See box 58 of FIG. 3. Such local data may include information relating to patterns or trends identified in the remote data. To accommodate this need of recording local data, the host computer 12 allows storage of the local data entered by way of one of the local input devices 14 such as the keyboard 26. Actual entry of the local data may take place in a "window" on the display 32 after which the corresponding remote data may be selected so that the local data may be "linked" to the remote data. Note box 60 of FIG. 3. In the present description, the term "linked" refers to one piece of data being associated with another. In one embodiment, these may even refer to one piece of data being listed whenever another "linked" piece of data is retrieved. In another embodiment, "linked" may refer to various pieces of data being stored in a similar file.

After the generation of a multitude of local data linked to various remote data, the users may wish to discuss various patterns and make conclusions in a physical environment. In these cases, the printer 30 and the electronic drawing board 29 may be employed. First, the host computer 12 outputs the local data in the form of a print out by way of the printer 30. While any printer 30 may be used, in one embodiment, the printer 30 is a card printer which is capable of printing small, "index card-sized" cards 48. On these cards 48, not only is the local data printed, but also the remote data linked to the local data along with a corresponding identification code 42. As such, the remote data "linked" to the analysis may be viewed in real-time by way of the bar code reader in a manner similar to that associated with the aforementioned lists 46. It should be noted that the cards 48 may also be printed out with just an identification code 42 representative of a group of "linked" remote data if so desired.

Once a multitude of the cards 48 are generated, the same may be situated on the electronic drawing board 29. In the present description, the electronic drawing board 29 may include any medium wherein a writing utensil may be used to create a visible image and such image may be stored on the host computer 12. Once the image is stored and no longer needed, the visible image may be erased and the board reused. In one embodiment, the electronic drawing board 29 includes a conventional marker and a white drawing board 29 that functions in a manner similar to a "glider" mouse common on many conventional computer keyboards 26. When the local data generated on the drawing board 29 is stored, the same may be "linked" to the local data of the cards 48. Of course, the drawing board 29 and printer 30 may be used independently depending on the needs of the users.

Figure 6:
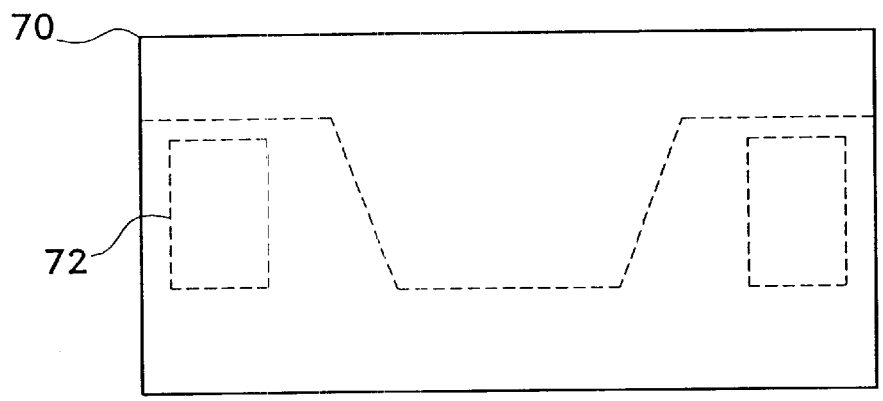
FIG. 6 is a front view of one of the sleeves of the present invention.
Figure 7:
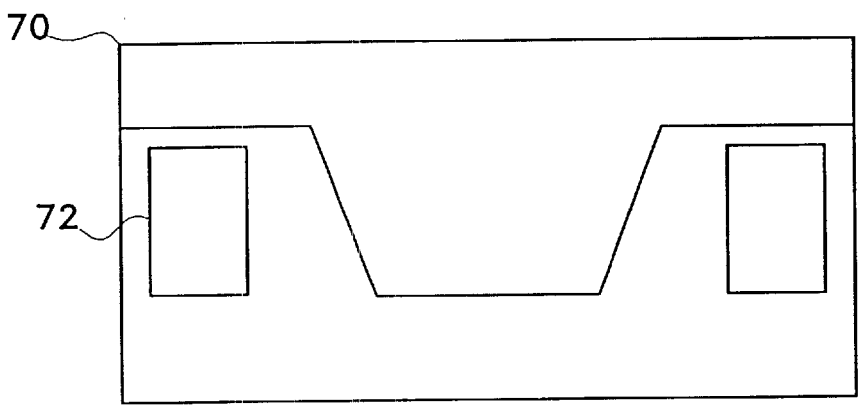
FIG. 7 is a rear view of one of the sleeves of the present invention.

In order that the cards 48 may be easily attached, removed and maneuvered on the electronic drawing board 29, a plurality of sleeves 70 is provided, as shown in FIGS. 6 and 7. Such sleeves 70 may be constructed from a transparent plastic for housing one of the cards 48 while further allowing the same to be viewed. Finally, magnets 72 may be situated on a rear face of the sleeves 70 for allowing the cards 48 to be removably attached to the drawing board 29 in a convenient manner.

Example of Use

One example of the manner of use of the present invention will now be set forth. In the present example, the present invention may be used to determine whether an automobile related product works well in its intended environment. First, the remote input devices may be used to collect still images and video of the product in use by a number of persons. The remote input devices 10 may also be employed to record numerous audible interviews with the persons relating to their experience with the product. Upon all of the remote data being collected, the game is consolidated at a central lab where it is stored into the host computer 12 in a computer readable format, namely a digital format. As each piece of remote data is stored, a written description 44 and identification code 42, or identifier, is stored therewith.

With the remote data stored and identified, a team of users may begin perusing the remote data via the various local output devices 16. To facilitate such process, print outs may be generated by the host computer 12 that list each of the identifiers of the remote data. With these lists 46, the team may use the bar code scanner 28 to immediately retrieve the remote data and experience the same in real-time. This may be accomplished by merely scanning the listed identification code 42 of the identifier with the bar code scanner 28.

As the team begins noticing patterns, trends or anything else noticeable about certain pieces of remote data, further input may be entered in the form of local data. Using the keyboard 26, the team may also link the local data to the remote data on which it is based. Thereafter, the various local data is printed by the host computer 12 on index cards 48 which indicate not only the local data, but also the identifiers of the linked remote data. By this feature, the remote data may be retrieved at any time on the index card 48 through use of the bar code scanner 28. As an option, the users may simply forego inputting local data on the cards 48 and simply list groups of remote data and associated identifiers. Further, in the alternative, the cards 48 may not be generated at all.

To further utilize the remote data and any local data generated thus far for the purpose of coming to any additional conclusions, the team may utilize the electronic drawing board 29. In use, the cards 48 may be movably situated on the drawing board 29 after which the marker may be used to delineate various comments and discussions with respect to the cards 48 or any other information. The local data which is generated with the drawing board 29 may optionally be "linked" to any corresponding local data generated by the keyboard 26 and further stored in the host computer 12.

With the present system, the process of analyzing data is well documented and organized from start to finish to not only aid the analysis and decision making process, but also provide an easily accessible historical account of how such decisions were made.

BEST MODES FOR CARRYING OUT THE INVENTION

Introduction

The purpose of the present invention is to improve how teams create requirements documents by supporting the process of transforming data into insights. In the spirit of Video Mosaic a goal is to support an iterative process that relies on sketching ideas, viewing and displaying a lot of material at one time, and utilizing the spatial relationships between materials to provide meaning for the work being done. It is important to enable a team to manipulate, record, and review its work, in any format used, throughout the entire design process. Enabling a team to effectively create requirements documents is based on three separate, but interdependent elements that are highlighted hereinafter:

1. Analysis Framework

An analysis framework and a structured process are necessary to facilitate the analysis of enormous amounts of qualitative data. Without an agreed-upon process, the team spends valuable time negotiating a process; and lack of an analysis framework can lead to ad-hoc and possibly incomplete analysis.

2. Managing and Displaying the Data

Software tools to digitize, store, index, and access large amounts of multimedia data enable a team to easily work with any of the data by following established links.

3. Connecting Paper to the Computer

It is important to create a working environment that facilitates team interaction as well as the capture of design rationales through the innovative, integrated use of paper, whiteboards, and computers.

The present invention is an immersive team environment. It consists of software tools to manage multimedia data, numerous display devices and writing surfaces, and the use of barcodes to link paper, displays, and data. The present discussion presents the key features of the present invention: the Analysis Framework, Managing the Data, Displaying the Data, and Connecting Paper to the Computer. Examples of use are presented throughout the present description.

Background

The experiences transforming data into requirements documents led to the creation of the present invention. Over the past few years, much participation has been made in projects to develop knowledge management systems, collaborative tools for multi-site project teams, mobile computing applications, and interactive multimedia applications. For example, an extensive project to develop a knowledge management vision for an organization has been completed. The resultant documents—a Vision Report, and the supporting Human-Centered Design Analysis Report—were based on data collected at 17 sites in seven countries, where a team of four people observed and interviewed more than 150 people over a three month period.

During the knowledge management project, a simple, custom-built data structuring software application was used to catalogue the data and begin the analysis. However, the in-depth analysis was done without the benefit of computerized tools. Using well-known knowledge management frameworks to structure the analysis, an electronic whiteboard was used to sketch scenarios and PostIts™ placed on a whiteboard to create diagrams, matrices, and tables. The PostIts and electronic whiteboard printouts helped to display key issues and the problems to address. While this process worked, it was cumbersome, inefficient and time-consuming. In the end a scattered pile of PostIts were left and much of the project history was not preserved.

During the knowledge management project, it was documented that all of the activities by recording the work as digital images and 35 mm slides. Using these materials, it was realized the key factors that influenced the way design sessions were conducted. The outcome was a set of goals for the present invention: to support team-based analysis, facilitate informal interaction, utilize technology to improve the process, and enable teams to use common objects including pen and paper.

A basic premise of the present invention design is that the analysis and synthesis of observational data into requirements documents should be accomplished by teams, since teams bring in multiple perspectives to minimize the influence of individual biases. A typical team may consist of experts in a company or industry, social scientists experienced in describing and identifying social and cultural factors, designers, and perhaps the people who are expected to use the resultant technological system. The importance of supporting informal collaborative work have been demonstrated. In many cases the social interaction involved in building consensus is crucial. A team working on complex problems establishes a common context regarding the meaning of data by discussing, analyzing, and repeatedly reviewing it together.

Researchers examining the use of technologies for group work point out the importance of natural interactions between team members, especially when using computers to assist or support the team's activities. Issues involve shared displays, turn-taking, recording activities and modes of interaction with objects.

Design Elements

Analysis Framework

In at least one embodiment of the present invention, data collection methods are employed such as video ethnography and contextual inquiry to observe everyday work practices, organizations' activities, and consumer behaviors. The practical benefits of these methods are well-documented. They ensure a rich understanding of an environment, situation, or activity, which is to be supported by a new or changing technology solution.

Analysis is typically done by looking for patterns in the data. Building on previous approaches, a simple analysis framework was created, which structures the data and allows for the use of numerous clustering and brainstorming techniques throughout the analysis, synthesis and design phases of a project. This simple structuring provides for a bottom-up approach for reaching the highest levels of data abstraction, going from data to requirements. At the same time, hypotheses are used for a top-down approach to ensure full coverage of a problem domain.

Figure 8:
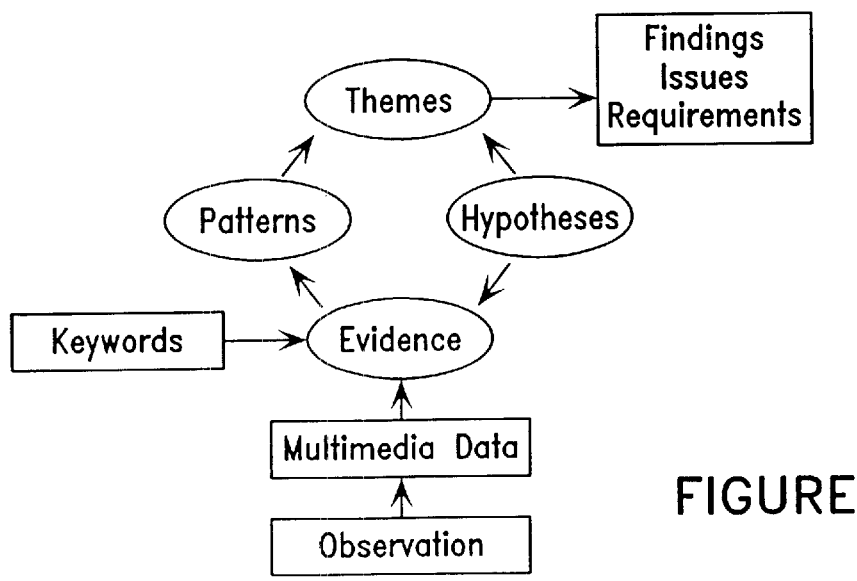
FIG. 8 diagrams the elements of the Analysis Framework which are incorporated into the present invention.

FIG. 8 diagrams the elements of the Analysis Framework, which are described below, while FIG. 9 presents an example for each element.

Evidence is the basic unit of analysis. A piece of evidence is a significant action, quote, or description taken directly from the multimedia data gathered during observation. A project usually has hundreds to thousands of pieces of evidence, each of which is tagged to a piece of media.

Keywords are important concepts that are used to assemble the evidence into meaningful subsets during the initial stages of analysis. A piece of evidence is usually tagged to multiple keywords. In the past, a project may have fifty keywords.

Patterns are meaningful groupings of evidence derived from a bottom-up clustering of evidence. The projects typically result in fifty to one hundred patterns.

Hypothesis are a special type of Pattern. They are key questions the team needs to address when gathering data. Evidence is gathered to confirm or disconfirm hypotheses.

Themes are the important dimensions of a problem domain that emerge during the analysis process.

Experience shows that every project would have varying needs with regard to the data to be captured and analyzed. The analysis framework is simple, yet flexible, providing the freedom to assign specific types of labels to data instead of creating an overly structured, and therefore inflexible analysis framework. For example, in a current project "suggested solutions" and "surprises" keywords were used to organize subsets of evidence that may not directly relate to the bottom-up approach of identifying themes and patterns from evidence.

Following the approach of others who found that new tools need to work in concert with many other team activities the present invention allows a team to use any number of techniques or tools to transform evidence into patterns, and patterns into themes. For example, cluster analysis was useful in a project in which there was interest in the intersection of evidence across many keywords. Similarly, affinity diagramming is used to identify themes from patterns.

Managing the Data

The present invention utilizes software tools to digitize, store, index, and access large amounts of multimedia data including the video, audio, and photographic data gathered during data collection. All of the elements of the analysis framework just described are also captured and stored.

MAST (Multimedia Analysis Software Tool) was developed for use throughout the entire analysis and synthesis process. MAST supports data capture and storage, data entry, and searching and display capabilities. Digitized media clips can be played and views of organized subsets of the local data can be displayed. All of the interactions between the objects, devices, equipment, and displays of the present invention are managed by MAST.

The best way to quickly and easily view data is to digitize it. Providing easy, nonlinear access to the original source data is essential. For example, during analysis a team views media clips to create consensus about the meaning of pieces of evidence and to clarify their interpretations of events that transpire in a particular media segment.

MAST, as shown in FIG. 10, is the glue that holds all of the elements of the present invention together. In the lab, team members can work with Interaction Objects, use the Interaction Devices to input, save, and retrieve data, view materials on the Display surfaces, and write on the whiteboards. The use of these objects and devices are detailed hereinafter.

MAST maintains the links between multimedia data and evidence, and links between the various analysis elements as well as storing electronic whiteboard drawings. Providing this automatic "traceability" of the analysis and design process is a key feature of MAST. Preserving the history of the team's activities provides a rich design rationale. There have been numerous efforts to capture design histories often requiring the team to take extra steps to document their work. The approach to this challenging problem is to make it an easy, almost invisible part of the analysis process.

The value of the captured history is apparent dulling the analysis process. It allows teams to easily review their work when there are questions about how they arrived at particular conclusions. In creating the final project documents accessing the captured history provides linkages between the underlying empirical data and the findings and issues which shape the final outcomes.

Displaying the Data

The ability to manipulate and view large amounts of data at one time is critical throughout data analysis. The present invention supports the use of a multi-monitor computer display, as well as using walls as displays.

Figure 11:
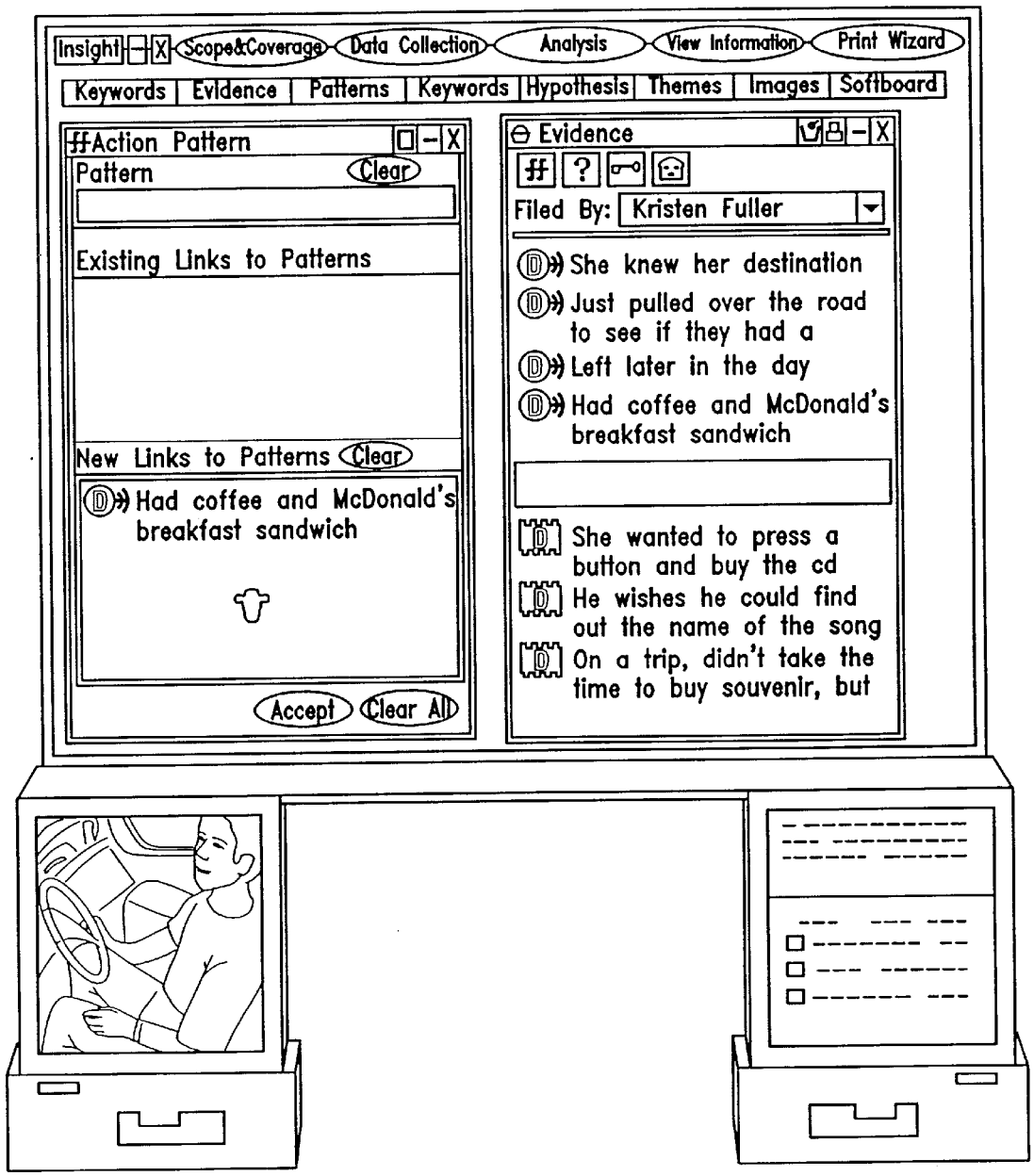
FIG. 11 is a front view of the displays of the present invention.

Three 800×600 resolution displays provide a large surface for groups to view the MAST information and see several levels of data detail simultaneously. The lab of the present invention is long and narrow, 9 feet by 27 feet space prevented one from using three contiguously displayed high-resolution projectors on the long wall because a projector's focal length is more than nine feet. Therefore, the displays were placed on the nine-foot wall using a projector in the center and thirty-one-inch color monitors on the left and right, as shown in FIG. 11. The different sizes of the displays creates a discontinuity causing some problems when moving the mouse between screens.

The different sizes of the displays also presents a challenge regarding readability. It was determined that the content of each display should be legible from twelve feet away, since teams sitting around a table are likely to be seated at that distance. To achieve the perception that text displayed on each screen is approximately the same size, the smaller monitors use a larger font size than the center projector. A 10pt. font is used on the center display and an 18pt. font on the two side monitors. As can be seen from the picture in FIG. 11, the relative sizes of the fonts in the windows appear comparable. The use of varying font sizes constrains the movement of windows from one monitor to the other.

Figure 12:
FIG. 12 illustrates an example of a window of the present invention.
Figure 13:
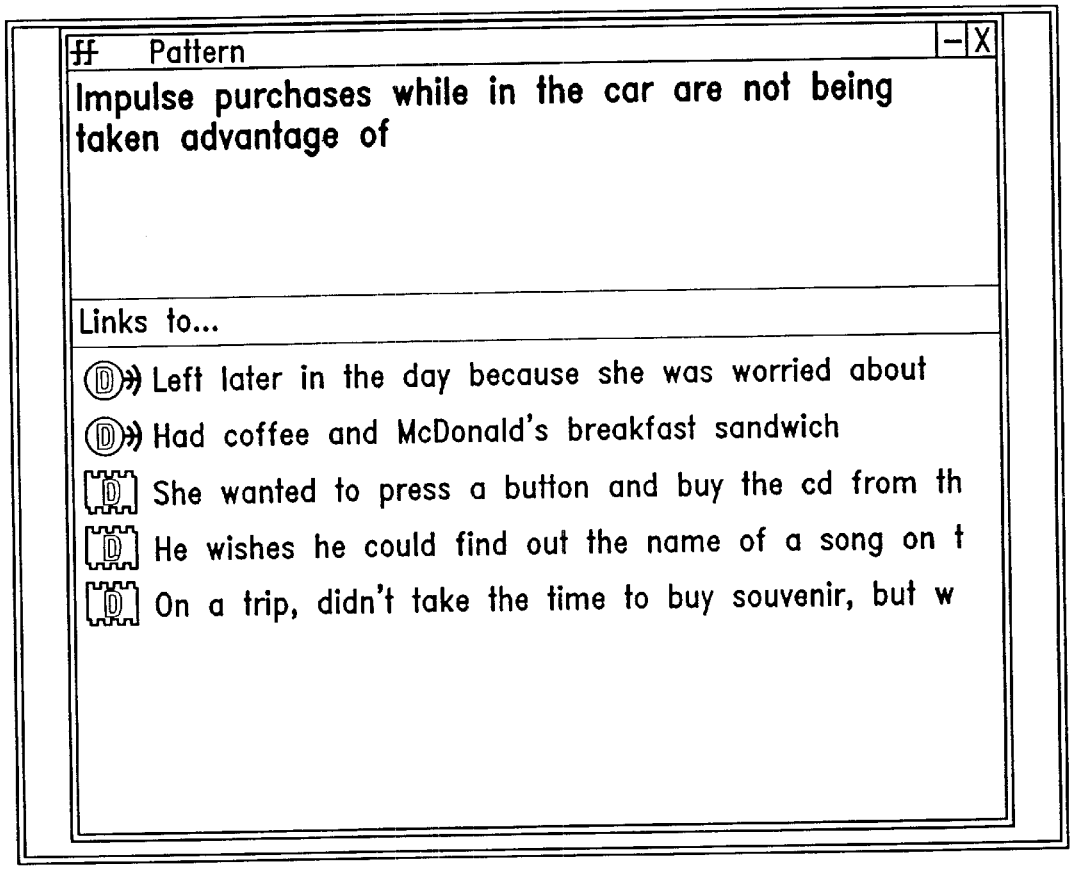
FIG. 13 illustrates yet another example of a window of the present invention.

The MAST application consists of a combination of interaction windows and windows that are used for display only. Windows that require user interaction are placed on the center screen, whereas video clips are played on the left monitor, and additional details of data is viewed on the right monitor. The interaction windows on the center screen are used to create and maintain links among different levels of data. Example windows are shown below in FIGS. 12 and 13. It should be noted that the windows may depict the remote data in the form of video, images or the like.

Figure 14:
FIG. 14 is an illustration of the use of walls as display spaces for information, in accordance with one embodiment of the present invention.

During the knowledge management project all of the lab walls were covered with diagrams, notes, matrices, drawings, and affinity diagrams. It was found very useful to have easy access to the materials. This was important for comparing different ideas at one time, as well as quickly and easily moving items around to make new groupings of information. Even the use of three high-resolution displays does not provide sufficient display space so there is still reliance on walls to provide additional display surface. Thus, in designing the present invention it was desired to preserve this capability, while also creating connections between the papers and sketches with the materials stored in the computer. When the walls are covered with paper linked to the computer via barcodes, the entire room, in essence, becomes a huge computer display. Note FIG. 14.

Connecting Paper to the Computer

The uses of paper and whiteboards by teams is well understood. Paper is used for reading, sketching, and annotating. Similarly, whiteboards are used for sketching, capturing emerging thoughts and viewing materials. The use of whiteboards in the present invention is discussed hereinafter. Research shows how individuals annotate paper to gain an understanding of what they are reading. Paper is also used to spatially display a lot of material at one time, and to easily move between documents or sections of documents.

The key to the success of the present invention is the creation of a seamless interaction between the computer and these other forms, namely paper and whiteboard. Utilized were a barcode reader, a custom designed barcode command slate, and barcode enabled paper forms, which is called "Linked Sticky Notes" and "Linked Data Reports," to facilitate this interaction between paper objects outside of the computer and the data stored in the computer.

Just as Video Mosaic connects paper-based storyboard elements, digital elements and video clips through the use of scanners and barcodes, the basic components of a design project were connected using barcodes. DigitalDesk supports activities that utilize pre-existing paper documents. For example, the calculator tool retrieves numbers from a printed page using image processing technology eliminating the need to punch the numbers into a calculator before they can be manipulated. These two systems provide important evidence of the ways in which paper usage is an integral part of many activities.

In accounting for the use of the paper, sticky notes, and whiteboards, a concerted effort was made to understand where a team's focus is at any given point in the analysis process and what activity they are doing. When team members are working individually, there is support for the use of personalized printouts. When they are discussing items there is support the use of the personal printouts, as well as the computer displays and whiteboards to create a shared workspace. The following sections provide examples of how the team uses paper during different points in the analysis process.

MAST can generate any number of customized data reports filtered or sorted using various criteria. The example below shows a report of evidence sorted by keywords. Associated with every item on a report is a barcode identifier that can be scanned to display details about the item. Scanning the barcode for a piece of evidence plays its digitized video or audio clip.

The first step of data analysis is to create patterns from evidence. The team begins by reviewing all of the evidence using linked evidence reports, or lists, as shown in FIG. 4. The team members spend time individually reviewing the evidence and making annotations on their own printed reports, which is followed by a discussion about the pieces of evidence. When hundreds to thousands of pieces of evidence are collected by multiple people, individuals may need additional information to understand evidence they have not seen before. To gain context, they can view a corresponding video clip for any piece of evidence by scanning the barcode associated with a piece of evidence listed on a report. Scanning a barcode to review a media clip is simpler and faster than using the computer to search for the particular clip to play. Similarly, when the team is already using the printed reports, it is far simpler to scan barcodes to link a piece of evidence to a pattern than it is to turn attention to the computer to open windows, search for an item in a window and drag-and-drop it to a pattern window.

As a team conducts analysis and creates patterns and themes, MAST is used to create associations of evidence into patterns and themes. New patterns or themes are printed on 2"×3" magnetic cards, as shown below. A "Linked Sticky Note" can be placed on a magnetic whiteboard.

Scanning the barcode identifier on a pattern's Linked Sticky Note displays its underlying information on the computer monitor. There is a natural fluidity in the way that one can point to an object and scan it to view its underlying information, rather than turning attention from the object to the computer to search for the item. This retains the person's focus on the object they are already using.

Enabling a team member to easily trace the history of the pattern by viewing all of the underlying data ensures that the team is referencing the actual data, not working from memory. It is common for team members to review all of the evidence linked to a pattern; it helps the team maintain a common understanding of the meaning of the pattern.

When the team is developing conclusions, extensive discussions are captured using the electronic whiteboard. Team members sketch ideas, diagram relationships between interesting elements of the domain, and articulate key points. As they are working at the whiteboard the team does not want to think about which drawings will be important. Thus, every image is automatically saved and stored. All of the electronic whiteboard images created by the team are digitally stored in the MAST database. These images, tagged with barcode identifiers, are printed and displayed on a tackable fabric wall. These are called "Linked Images". It should be noted that numerous Linked Images may be created using the electronic whiteboard.

As themes begin emerging, Linked Images of previous analysis sessions are moved around the room and placed with images of related discussions. These images are easily associated with themes. They can be displayed on the large projection screen for easy viewing by the entire team, and can be retrieved for editing using Adobe Photoshop™ or other image editing programs.

The Barcode Command Slate provides shortcuts to initiate the actions most commonly used during analysis. It is a printed list of barcoded commands for invoking specific actions. The use of the Slate enables the team to maintain focus on their work by providing a better mapping between what they want to do and how they start it.

To "Create a Pattern" they scan the "Create a Pattern" barcode rather than using a series of mouse moves and mouse clicks to find and open a series of windows that are needed to create patterns. The Barcode Command Slate has three different types of commands which are shown in FIG. 15.

The Barcode Command Slate works in conjunction with the MAST interface. When a command is invoked the appropriate windows are opened and displayed, providing feedback that the Barcode Command Slate actions are working properly. For example, when the "Create a Pattern" barcode is scanned, the "Action Pattern" window is opened and displayed. As pieces of evidence are scanned to add them to the pattern, the evidence is displayed in the Action Pattern Window.

The use of the Command Slate and wireless keyboard extends the reach of the computer application, saves time, and makes complex actions simple. The Command Slate is particularly valuable when creating patterns from evidence reports and creating themes from pattern Linked Sticky Notes.

The interplay between paper, sticky notes, and computer occurs throughout the analysis process. Using the Linked Interaction Objects together—Linked Sticky Notes, Linked Data Reports, and Linked Images—dramatically enhances the analysis process. The team can focus on the content of their work because the use of these objects minimizes the amount of effort required to access, manipulate, view, and create data.

The challenging part of analysis is developing the higher-level frameworks that explain or give meaning to a particular problem. A team arrives at these frameworks by repeatedly organizing and reorganizing the available data. People attach meaning to spatial relationships they create between the objects and materials they display. This improves how they interpret and remember the data. The use of Linked Sticky Notes allow the team members to easily move the content around on the whiteboard. For example, they can group the Notes into an affinity diagram. They can create themes, which associate all of the Linked Sticky Notes included in the diagram. The group can then either retain the diagram or move the Sticky Notes knowing that they have recorded the theme, which is also represented by a Linked Sticky Note.

While there is continued development and enhancement of the present invention, much is learned about its strengths and limitations by using the lab. Recently completed is a project to describe information needs surrounding the use of a car; this will be used to identify new services that could be delivered to people with in-car computing and GPS (Global Positioning System.) Three researchers used the present invention for over a month to analyze behavioral data collected through numerous observational techniques, resulting in activity logs, video, audio, and photographic data.

The experience reinforced the design decisions that were made with regard to team attention and focus. The team spent numerous days reviewing the evidence reports to create patterns. Using the present invention has dramatically improved the speed and effectiveness of creating these patterns. It was also found that all team members would only direct their attention to the computer displays as needed, such as during discussions about precise wording of a pattern. During later stages of analysis, the Linked Sticky Notes were effective in allowing the team to fluidly move back-and-forth between high-level issues and underlying data in a unified manner.

Alternate Embodiments

Some additional capabilities would enhance the use of the lab. For example, the Linked Sticky Notes were placed on the whiteboard to manually carry out affinity diagramming. To create a theme and associate patterns and images with it, the team members must use the command slate, barcode scanner, and keyboard. Instead, it is desired to pursue the ideas presented in SILK for using screen (Whiteboard) gestures to make the association between patterns. More information regarding SILK may be found in a publication, "Interactive Sketching for the Early Stages of User Interface Design" by Landay, J. A., and Myers, B. A., which is incorporated herein by reference. By circling a group of clustered patterns and images, a theme would be created. The use of audio interface components is also considered to enhance how data can be manipulated by teams in a way that increases their focus on the data, not interaction with the computer.

The use of the present invention is currently being expanded into other aspects of the design and development process. There is investigation on the use of the present invention for design teams who are reviewing the Requirements documents. As such, hybrid paper documents have been developed that take advantage of the present invention capabilities by utilizing the best of paper, the media server, three-screen display, and the barcode scanner. The document enables team members to create electronic annotations, bookmarks, and keywords, which link back to a paper-based document.

Collection of Remote Data

As mentioned earlier, remote data is collected from the field and may take on many forms such as video, still pictures or surveys. Various types of data collection systems have been available in the past for use in conjunction with panels of human respondents. Some of the uses for such systems are to test consumer response to a new or existing product, or to sample the buying habits of the panel of respondents. The respondents can be asked questions verbally, with or without the assistance of visual aids, or they can be asked to read through a booklet which directs the respondents through a series of questions to be answered.

The respondents can be given pieces of paper to write answers to the questions being asked of them, or they can be provided with some type of electronic device which they use to record their answers electrically. Electronic systems presently available are capable of receiving the respondents' answers and storing those answers in real time into a computer system. Such electronic systems are also capable of displaying those answers in real time on a video monitor. The video monitor can show the numbers of like answers in a bar chart format, for example, and/or can show the raw data (in numerical form). One such system presently available is known by the name AcuPOLL, manufactured by AcuPOLL Research, Inc., and is used by market survey companies.

The presently available AcuPOLL electronic data collection system uses enclosures which contain several numerical keys (such as "0" through "10") for the individual respondents to use in answering questions. Such keypad enclosures are "dumb" devices in that they do not present information to the user of the keypad (the respondent, or other person who may be testing or setting up the system). Such keypads may have a light or two that provides some information. However, even with that light, the units are still not "intelligent" devices, providing only minimal information. In addition, each of these dumb keypads can only sense, and then transmit to a remote location, a single keystroke (0 through 10, inclusive) of information that represents the answer for any particular question.

The heart of a data collection system, such as AcuPOLLT, is a main computer which stores data received from the individual keypads. Since several keypads (up to at least one hundred units) can be used in a single data collection system, each individual keypad must have some type of identification means so that the main computer can determine which individual keypad is transmitting information at any given moment. With such mean, the main computer can keep track of what answers are being given by which respondent, thereby enabling the data collection system to categorize the answers by type of respondent (male or female, for example). Since the keypads of the AcuPOLL system are "dumb" devices, they cannot be programmed to change their operating characteristics, and they also must have their identification means "hard" coded. In other words, each of the AcuPOLL keypads must have some type of identification means in hardware (rather than in software or firmware). Such identification means could be a programmable switch (such as a seven-position DIP-switch) within each keypad, or it could be merely by the use of connecting the correct wires from the main computer into the respective keypads (and being truly "hard"-coded).

Consequently, the data collection systems which are available at the present time must be set up by a rather regimented routine so that the correct keypads (having the correct identification number) are placed at their proper locations. Each keypad must be either attached to the correct wiring, or each keypad must have its identification switch (if one exists) set to the correct number. All this must be accomplished while the set-up procedure takes place, in view of the fact that the physical location of each keypad (according to its identification number) is usually very important to the overall survey results. Such procedures can be very time consuming when setting up a new testing room.

Data collection systems available at the present time also are limited in that the keypads cannot be used to send information to the person located at the keypads. With more sophisticated test sampling occurring in the future, it would be desirable to be able to communicate information from the main computer to each of the respondents who are using those keypads. Such messages could inform a respondent that the last answer given was not within the correct range of acceptable numbers, for example, for questions asking for only certain numbers as answers.

Presently available data collection systems are not capable of accepting several keystrokes from the keypads as answers to questions. In such systems, the respondents are restricted to using only one keystroke per answer, thereby allowing for only a range of zero (0) through ten (10), inclusive. A data collection system having "smart" keypads, which have more capabilities are required for such increased capabilities.

Yet another means of collecting the remote data entails the use of cameras. Modern digital cameras typically include an imaging device which is controlled by a computer system. The computer system accesses raw image data captured by the imaging device and then processes and compresses the data before storing the compressed data into an internal memory. Efficient operation of the computer is therefore an important consideration for camera designers and manufacturers. The memory architecture of a particular computer system determines data storage techniques and can thus significantly effect the operational efficiency of the entire digital camera system.

The user interface in conventional digital cameras typically includes a view finder in which small versions of the captured images may be displayed to allow a user to review several images at once. By selecting one of the images, the user may then display the full-sized version of the images in the view finder.

The images captured by the digital camera are typically named by numbering the images starting with an initial number, such as the number one, and ending with a maximum number. The images displayed in the view finder may then be identified by their assigned numbers. Once the maximum number of images has been named, the user must delete the images or download the images to a host computer in order to clear the camera's memory. Thereafter, the camera begins naming new images starting with the number one again.

This conventional method for naming images results in several naming conflicts that may result in some images being overwritten and lost. One type of naming conflict occurs in cameras that are equipped with some type of removable storage medium for storing images. For instance, assume that the removable memory, such as a flash disk, includes a series of old images that are named from one to the maximum number as described above. If the user begins capturing images, the camera will begin naming the new images starting with the number one since the maximum number has been reached. This results in the old images stored on the removable memory being overwritten by the new images that have the same names.

Another type of naming conflict occurs when conventional cameras are connected to a host computer for transferring images. Assuming that both the host computer and the camera include stored images, then both the host computer and the camera may have a set of images with the same names. If any attempt is made to the download images from the host computer to the camera, then the images with the conflicting names in the camera may be overwritten. Similarly, if any attempt is made to upload images from the camera to the host computer, then the images in the host computer with the conflicting names may be overwritten.

In one method, the digital camera maintains a count of the total number of captured images stored in the camera, and then incorporates this number in the name assigned to each image. Although this creates unique image names for the images captured by a particular camera because the nonrepeating count total, naming conflicts may still arise when a single removable memory device is used to store images from a number of different cameras, because each camera will eventually generate the same images names.

A digital camera typically includes an image sensor having an array of picture elements, generally referred to in the art as pixels, that are positioned contiguous to each other. Each pixel functions to form one discrete element of the electronic representation of the image which, when assembled together in the array, forms the total electronic image representation.

The image sensor operates by converting optical energy it receives into separate charge packets at each pixel. The amount of charge that is produced is dependent upon the light level and time of exposure. The charge packets are then read out from each pixel and stored to a storage medium, for example a well known PCMCIA ATA memory card (memory card), or internal memory of the digital camera for later retrieval.

The stored images may then be exported to a personal computer (PC) system for display on its PC monitor, such as for example a typical cathode-ray-tube screen (CRT), or for printing a hardcopy via a printer. For such exporting, the memory card may be inserted into a PCMCIA drive of the personal computer for permitting user interaction. Alternatively, the content of the memory card or internal memory may be downloaded to the personal computer through a serial communication cable by the image manipulation software program. Presently, this is the only method of retrieving images stored in the internal memory.

The images are temporarily stored in random access memory (RAM) by such image manipulation programs during its operation. However, it may be desirable to permanently store the images on either a hard disk of the computer, or a computer-insertable floppy disk. In the case of permanent storage, an operating system (OS) that resides on the computer will create an entry on a disk file directory and then update the file allocation table, FAT. The file directory contains all basic file information such as file name, date and time of creation and location of FAT. The FAT is an indexing system for the OS to indicate the location of each file on the selected disk. Both the file directory and FAT are permanently stored on the particular disk selected, typically a floppy or hard disk.

The file directory and FAT comprise a standard file system used by computers utilizing a "WINDOWS" or DOS-based OS for indexing each particular data file to a storage location, and in the present case, it indexes the location of each data file representing a recorded image.

Although the presently known and utilized system and method for retrieving images from a digital camera are satisfactory, they are not without shortcomings. First and foremost, most desk-top personal computers do not have a PCMCIA drive, and in this case, access through the serial port is the only means of retrieving images. In either case, the recorded images are received by the image manipulation software program in compressed form from the camera, and are decompressed by the software for permitting either display, user manipulation or printing. For permanently storing the images, the images are either compressed again for minimizing memory storage size or stored in decompressed form. However, this recompression, if it uses a well known lossy compression method for obtaining a higher compression ratio, can cause further loss of detail, and if the image is not re-compressed, a large portion of memory space is obviously consumed for storage.

Retrieval of Data

When faced with ill-defined problems requiring information access, one often wants to explore the resources available before exploiting them. This exploration may be partly aimed at refining the understanding of the potential space of content that is available, and partly aimed at formulating a concrete course of action for getting specific documents. Interfaces that support the browsing of a collection, as opposed to searching a collection, are aimed at satisfying this need to learn more about a collection before taking action.

Scatter/Gather is a document browsing technique aimed at supporting such exploratory learning. The emphasis in this browsing technique is to present users with an automatically computed overview of the contents of a document collection, and to provide a method for navigating through this summary at different levels of granularity. The central primitive operation in Scatter/Gather involves document clustering based on pairwise document similarity. The technique aims to place similar documents into the same cluster. Recursively clustering a collection produces a cluster hierarchy.

For each cluster, at each level of this hierarchy, the user is presented with summary information about the cluster that presumably communicates something about the kinds of documents it contains. The user may then select (gather) those clusters that seem interesting or relevant. This subset of clusters can then be reclustered (scattered) to reveal more fine-grained clusters of documents. With each successive iteration of scattering and gathering clusters, the clusters become smaller and more detailed, eventually bottoming out at the level of individual documents.

Bar Code Readers and Hyperlink methods

Various types of hand-held bar code readers such as wands, fixed beam, moving beam, and linear CCD readers, have been developed for many applications. Wands, fixed beam, and moving beam readers all operate using the same basic principle. Typically, a small spot of light is directed from a source of illumination to the surface of the bar code and is swept across the entire length of the bar code (i.e. a scan line). The intensity of the reflected light from the beam is modulated by the bar code pattern. This reflected light is gathered by optics and focused on an optical detector which converts light intensity to an electrical signal. Since light areas reflect more than dark areas the reflected light intensity represents the digital code which serves to identify the content of the bar code symbol. The wand is the least complicated of these readers and consists of a light source (typically an LED) and a photosensitive element in a pen-like package. The operator must sweep the wand across the length of the bar code while keeping the tip of the wand in contact with the bar code. This severely restricts the use of wands to applications where the operator can physically contact the bar code. Additionally, repeated sweeps of the bar code are typically necessary to obtain a valid read, increasing the overall time required to read each bar code. Wands will not read damaged or poorly printed bar codes.

A fixed beam reader operates with the same basic principles as the wand without the need to maintain physical contact with the bar code. The spot, typically produced by an LED or laser, is projected from the reader to distances up to about one foot. The operator is required to sweep the projected spot across the bar code. Fixed beam readers require very careful and accurate aim. Additionally, hand motions or jitter is amplified as the distance to the bar code increases. The longer the range, the larger the bar codes must be. Fixed beam readers will not read damaged or poorly printed bar codes.

Moving beam readers direct an LED or laser beam in a repetitive linear (i.e. one-dimensional) scanning pattern using rotating or vibrating mirrors and lenses. These readers eliminate the need for manual scanning or sweeping of the code. A moving beam reader typically scans at about 40 scans per second, allowing multiple tries on a bar code. This provides a better chance to get a valid read on a bar code with minimal damage. However the readers must get a complete valid scan (i.e. cut through all of the bars in one sweep) in order to decode a bar code. Moving beam readers are also restricted to reading small codes up close and large codes far away. Typical range of moving beam readers is about one foot. Moving beam readers will not read damaged or poorly printed bar codes.

Linear CCD readers eliminate the need for mechanically sweeping a beam across bar codes, but require a bright source of illumination. Linear CCD readers capture a one dimensional image of the bar code and read out the information as an electrical signal which is similar to the output of wand, fixed, or moving beam readers. Linear CCD readers have an extremely small depth of field of about one inch, and are usually limited to reading bar codes shorter than the width of the CCD reader head (typically less than 3 inches). Linear CCD readers will not read damaged or poorly printed bar codes.

CCD readers typically use light emitting diodes (LED) for illumination. Attempts have been made to improve the performance of linear CCD readers by using flash illumination. Examples of such readers are shown in U.S. Pat. Nos. 4,282,425; 4,766,300; and 4,570,057.

Electronic Drawing Boards

It is conventional in a meeting that the attendants discuss a preset issue on the basis of papers prepared in advance and/or information written or drawn on a blackboard or whiteboard on site, that they check the contents of the issue and amend them as needed, that the conclusion or interim results are recorded, and that a copy of the results of the meeting are distributed to the attendants and persons concerned.

Incidentally, throughout the specification, the terms written and drawn, in all forms, should be considered interchangeable with respect to the act of placing, or existence of, information such as characters, commands, images, graphics, pictures, etc. on a blackboard or whiteboard, whether electronic or not.

Electronic board systems are known as convenient means capable of facilitating a meeting. Such electronic board systems are disclosed, for example, in Japanese Patent Examined Publication (kokoku) No. 3-26855 and Japanese Patent Unexamined Publication (kokai) Nos. 2-200499, 1-125296, 63-209999, and 62-52630.

The electronic board system as disclosed in Japanese Patent Examined Publication (kokoku) No. 3-26855 is configured in such a manner that characters, graphics, etc. written or drawn on a screen of the electronic board system, with and through a writing device with an oscillator equipped therein, are detected as a sequence of data of coordinate positions through a sensor that is embedded in the electronic board. The sequence of the coordinate position data is stored in image memory, and the traces of the characters, graphics, etc. indicated by the sequence of the coordinate position data are displayed as the characters, graphics, etc. on a display screen. The sequence of the coordinate position data existing in a given region is deleted from the corresponding image memory, with and through a deleting device with an oscillator equipped therein, by performing operations for deleting the displayed coordinate position data from the given region on a screen of the electronic board, and the characters, graphics, etc. displayed in the given region are thereby deleted from the display screen.

The electronic board system as disclosed in Japanese Patent Unexamined Publication (kokai) No. 2-200499 is so arranged as to recognize characters, graphics, etc. written manually with a writing device on its board through a recognition processing device, and to record the result of recognition on recording paper.

Further, the electronic board system as disclosed in Japanese Patent Unexamined Publication (kokai) No. 63-209999 is configured in such a fashion that characters written manually are read through an image reader and recognized with an OCR, and the result of recognition is displayed on a screen of the electronic board in an enlarged manner.

In addition, the electronic board system as disclosed in Japanese Patent Unexamined Publication (kokai) No. 1-125296 is configured to recognize voices entered in a voice recognition device as letters, and to display the words corresponding to the recognized voices on the screen of the electronic board.

Furthermore, Japanese Patent Unexamined Publication (kokai) No. 62-52630 discloses an electronic board system which is configured to recognize characters and graphics entered manually on a transparent graphics tablet device through a stylus input device and to display the result of recognition on a display device, such as a liquid crystal screen, integral with the graphics tablet device.

In addition to those described hereinabove, a device is proposed in an article entitled "A New Face of User Interface: Features of Two Big OSs for Input through Pens" ("Nikkei Byte" Magazine, April, 1991, pages 233 to 238), which can translate particular traces of a pen on a graphics tablet device integral with a liquid crystal screen into edit commands, and edit the corresponding image displayed on the liquid crystal screen.

Furthermore, as introduced in the leaflet "Smart 2000 Series Products" of Smart Technology, Inc., Canada, a data processing system is proposed which allows the user to perform all operations in an interactive manner on a screen of the electronic board by recognizing characters, graphics, commands, etc. written through a pointing device on the screen of the electronic board, and projecting the result of recognition or the result of execution of the commands through an LCD projector on the screen thereof and displaying it in a real time basis thereon.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

We claim:

1. A system for exhibiting remote data during related analysis comprising:
   (a) at least one remote input device for recording remote data;
   (b) a host computer for receiving and storing the remote data from the remote input device wherein the host computer stores the remote data in a digital format and assigns the remote data an identifier;
   (c) at least one local output device coupled to the host computer for providing a medium with a link to the remote data thereon; and
   (d) at least one local input device coupled to the host computer for using the link to exhibit the remote data upon selection of the identifier during the course of analysis related to the remote data.

2. The system as set forth in claim 1, wherein the remote input device includes a video camera for recording video signal.

3. The system as set forth in claim 1, wherein the remote input device includes an image camera for recording image signals.

4. The system as set forth in claim 1, wherein the remote input device includes an audio recorder for recording audio signals.

5. The system as set forth in claim 1, wherein the remote input device includes a remote data recorder for recording data signals.

6. The system as set forth in claim 1, wherein the local input device includes a keyboard.

7. The system as set forth in claim 1, wherein the local input device includes a bar code scanner.

8. The system as set forth in claim 1, wherein the local input device is further adapted for inputting local data into the host computer.

9. The system as set forth in claim 8, wherein the local input device includes an electronic drawing board.

10. The system as set forth in claim 1, wherein the local output device includes a printer for printing purposes.

11. The system as set forth in claim 1, wherein the local output device includes a display.

12. The system as set forth in claim 1, wherein the identifier includes an identification code.

13. The system as set forth in claim 12, wherein the identifier includes a description.

14. The system as set forth in claim 13, wherein the host computer outputs lists of the identifiers on the medium by way of the local output device.

15. The system as set forth in claim 1, wherein the host computer stores local data entered by way of the local input device which includes a keyboard, the local data being linked to the remote data.

16. A method for exhibiting remote data during related analysis comprising the steps of:
   (a) recording remote data with at least one remote input device;
   (b) receiving the remote data on a host computer from the remote input device;
   (c) storing the remote data on the host computer in a digital format;
   (d) assigning an identifier to the remote data;
   (e) outputting a medium with a link to the remote data thereon; and
   (f) utilizing the link on the medium to exhibit the remote data upon selection of the identifier during the course of analysis related to the remote data.

17. A computer program embodied on a computer-readable medium for exhibiting remote data during related analysis comprising:
   (a) a code segment that receives remote data on a host computer from a remote input device;
   (b) a code segment that stores the remote data on the host computer in a digital format;
   (c) a code segment that assigns an identifier to the remote data;
   (d) a code segment that outputs a medium with a link to the remote data thereon; and
   (e) a code segment that utilizes the link on the medium to exhibit the remote data upon selection of the identifier during the course of analysis related to the remote data.

* * * * *